United States Patent
Inoue et al.

(10) Patent No.: US 8,264,762 B2
(45) Date of Patent: Sep. 11, 2012

(54) IMAGE DISPLAYING APPARATUS AND DISPLAY CONTROLLING DEVICE

(75) Inventors: Yoko Inoue, Tokyo (JP); Tomohiro Sasagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1323 days.

(21) Appl. No.: 11/987,097

(22) Filed: Nov. 27, 2007

(65) Prior Publication Data

US 2008/0239171 A1    Oct. 2, 2008

(30) Foreign Application Priority Data

Mar. 30, 2007 (JP) .................................. 2007-092033

(51) Int. Cl.
 *G02B 26/00* (2006.01)
 *G02B 26/08* (2006.01)
(52) U.S. Cl. ................. 359/290; 359/237; 359/298
(58) Field of Classification Search .......... 359/290–292, 359/198, 223–225, 245, 260–263, 298, 295, 359/301–303, 317–318
See application file for complete search history.

(56) References Cited

U.S. PATENT DOCUMENTS

| 2006/0033972 A1* | 2/2006 | Takemori et al. ............... 359/32 |
| 2007/0252918 A1* | 11/2007 | Furuya et al. .................. 348/742 |
| 2008/0165812 A1* | 7/2008 | Furuya et al. ................... 372/22 |
| 2010/0150186 A1* | 6/2010 | Mizuuchi et al. ............... 372/21 |

FOREIGN PATENT DOCUMENTS

| JP | 11-305710 A | 11/1999 |
| JP | 2004-279943 A | 10/2004 |
| JP | 2007-47638 A | 2/2007 |
| JP | 2007-163973 A | 6/2007 |
| JP | 2008-85038 A | 4/2008 |

* cited by examiner

*Primary Examiner* — Dawayne A Pinkney
(74) *Attorney, Agent, or Firm* — Birch, Stewart, Kolasch & Birch, LLP

(57) ABSTRACT

An image displaying apparatus includes laser light sources corresponding to a plurality of colors, while at least one of the laser light sources corresponding to one of the colors includes a plurality of wavelength conversion laser light sources corresponding to a mutually same color and has a plurality of outputs. The image displaying apparatus is operable to display a color image by causing a spatial modulation element to perform a spatial modulation process on laser beams output from the laser light sources by using a field sequential method. When the spatial modulation element performs the spatial modulation process on the laser beams output from one of the laser light sources (e.g., the green laser light source) having a plurality of outputs, a drive controlling device causes green laser emitting units serving as the wavelength conversion laser light sources to sequentially output pulses so that the laser beams output from the green laser emitting units continuously form substantially constant laser outputs that have substantially the same peak power as each other.

4 Claims, 11 Drawing Sheets ately control the section periods for the spatial modulation element as well as the laser beam emission timing and the pulse width of the plurality of laser modules. In addition, there is a limit to the switching period for mechanically driving the spatial modulation element. Thus, it is difficult to control the driving of the spatial modulation element in accordance with the laser beams that are pulse-oscillated with an arbitrary pulse width. Thus, the problem arises where it is difficult to achieve high image quality in the gradation display by increasing the number of sections (hereinafter, "period division number") into which the time period is divided.

IMAGE DISPLAYING APPARATUS AND DISPLAY CONTROLLING DEVICE

BACKGROUND OF THE INVENTION

1. Field of the Invention

The present invention relates to an image displaying apparatus and a display controlling device for having an image displayed by using wavelength conversion laser light sources.

2. Description of the Related Art

Conventionally, projection-type image displaying apparatuses like projection televisions use a spatial modulation element called micro display to magnify and project a generated image. One example of the micro display is a device called Digital Micromirror Device® (DMD), which is an element that performs a spatial modulation process by changing the reflection angle of light by using a very small movable mirror. This element employs a method by which a gradation display is achieved through digital control.

In the gradation display method implemented through the digital control, a time period corresponding to one TV field (59.9 hertz [Hz]) is further divided into sections (each of which has a length of, for example, microseconds to milliseconds), so that the modulation process is performed by switching on and off the pixels in a micro display for each section time period. Because this switching method (called a "field sequential method") applied to the pixels has an extremely high speed, the human eye recognizes a predetermined gradation level in each TV field, as a result of integration.

In recent years, many techniques for using laser light sources as light sources included in such image displaying apparatuses that employ the field sequential method have been proposed. Because laser beams have high directionality and high monochromaticity, when laser beams are used as the light sources, an advantageous effect is achieved where it is possible to provide an image displaying apparatus that has high image quality as well as a high luminance and a wide range of color reproducibility. To display an image in full color by using an image displaying apparatus that includes such laser light sources, it is necessary to use laser beams of which the light emissions are in the wavelength bands of at least the three primary colors (i.e., red [R], green [G], and blue [B]). Also, it is desirable to use laser light sources that are compact and have high electro-optic efficiency (i.e., high conversion efficiency). As the laser light sources, for example, a laser diode (LD) can be used for red (R), whereas Diode Pumped Solid-State Lasers (DPSSL) that emit wavelength conversion laser beams can be used for green (G) and blue (B).

These days, image displaying apparatuses have a tendency of having a larger screen and a higher luminance. Thus, the luminance level of the laser beam per module as described above is not sufficient. For example, to provide an image displaying apparatus having a projection luminous flux of 500 lumens (lm), it is necessary to use two or three high-output laser modules each having an average power of 3 watts (W). Thus, to provide an image displaying apparatus that uses laser light sources, it is an important goal to employ a plurality of laser modules in an optimal configuration while improving the luminance efficiency of each of the laser modules. For example, when wavelength conversion laser beams are used as the light sources, it is possible to improve the wavelength conversion efficiency and enhance the electro-optic efficiency by making a peak value of a fundamental wave higher with pulse oscillations.

In a light modulating device disclosed in Japanese Patent Application Laid-open No. H11-305710, laser beams corresponding to the colors are modulated by bringing pulse oscillation timing of the color laser beams into synchronization with pixel switching timing of a light modulation element, the color laser beams being oscillated from a red pulse laser, a green pulse laser, and a blue pulse laser, respectively.

The conventional technique described above, however, has a problem where, to reproduce an accurate gradation by using a combination of the pulse oscillation laser and the digital gradation display method, it is necessary to accur

SUMMARY OF THE INVENTION

It is an object of the present invention to at least partially solve the problems in the conventional technology.

According to one aspect of the present invention, an image displaying apparatus operable to display a color image includes laser light sources, a spatial modulation element, and a drive controlling unit. The laser light sources correspond to a plurality of colors, and at least one of the laser light sources corresponding to one of the colors includes a plurality of wavelength conversion laser light sources corresponding to a mutually same color and having a plurality of outputs. The spatial modulation element performs a spatial modulation process on laser beams output from the laser light sources by using a field sequential method to display a color image. The drive controlling unit controls driving of the laser light sources and also controls driving of the spatial modulation element according to the controlled driving of the laser light sources. When the spatial modulation element performs the spatial modulation process on the laser beams output from the at least one of the laser light sources having the plurality of outputs, during a time period assigned to the one of the colors corresponding to the laser light source having the plurality of outputs, the drive controlling unit controls timing with which a pulse driving is performed by each of the wavelength conversion laser light sources so that the wavelength conversion laser light sources sequentially output pulses in such a manner that the laser beams output from the wavelength conversion laser light sources have a substantially same peak power as one another and so that substantially constant laser outputs are continuously obtained from the wavelength conversion laser light sources. According to another aspect of the present invention, a display controlling device that is operable to control driving of laser light sources and a spatial modulation element that are included in an image displaying apparatus including the laser light sources corresponding to a plurality of colors, while at least one of the laser light sources corresponding to one of the colors includes a plurality of wavelength conversion laser light sources corresponding to a mutually same color and has a plurality of outputs, the image displaying apparatus being operable to display a color image by causing the spatial modulation element to perform a spatial modulation process on laser beams output from the laser light sources by using a field sequential method, the display controlling device includes a drive controlling unit that, when the spatial modulation element performs the spatial modulation process on the laser beams output from the at least one of the laser light sources having the plurality of outputs, during a time period assigned to the one of the colors corresponding to the laser light source having the plurality of outputs, controls timing with which a pulse driving is performed by each of the wavelength conversion laser light sources so that the wavelength conversion laser light sources sequentially output pulses in such a manner that the laser beams output from the wavelength conversion laser light sources have a substantially same peak power as one another and so that substantially constant laser outputs are continuously obtained from the wavelength conversion laser light sources.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image displaying apparatus and a display controlling device of the present invention will be explained in detail with reference to the accompanying drawings. It should be noted that the present invention is not limited to these exemplary embodiments.

Figure 1:
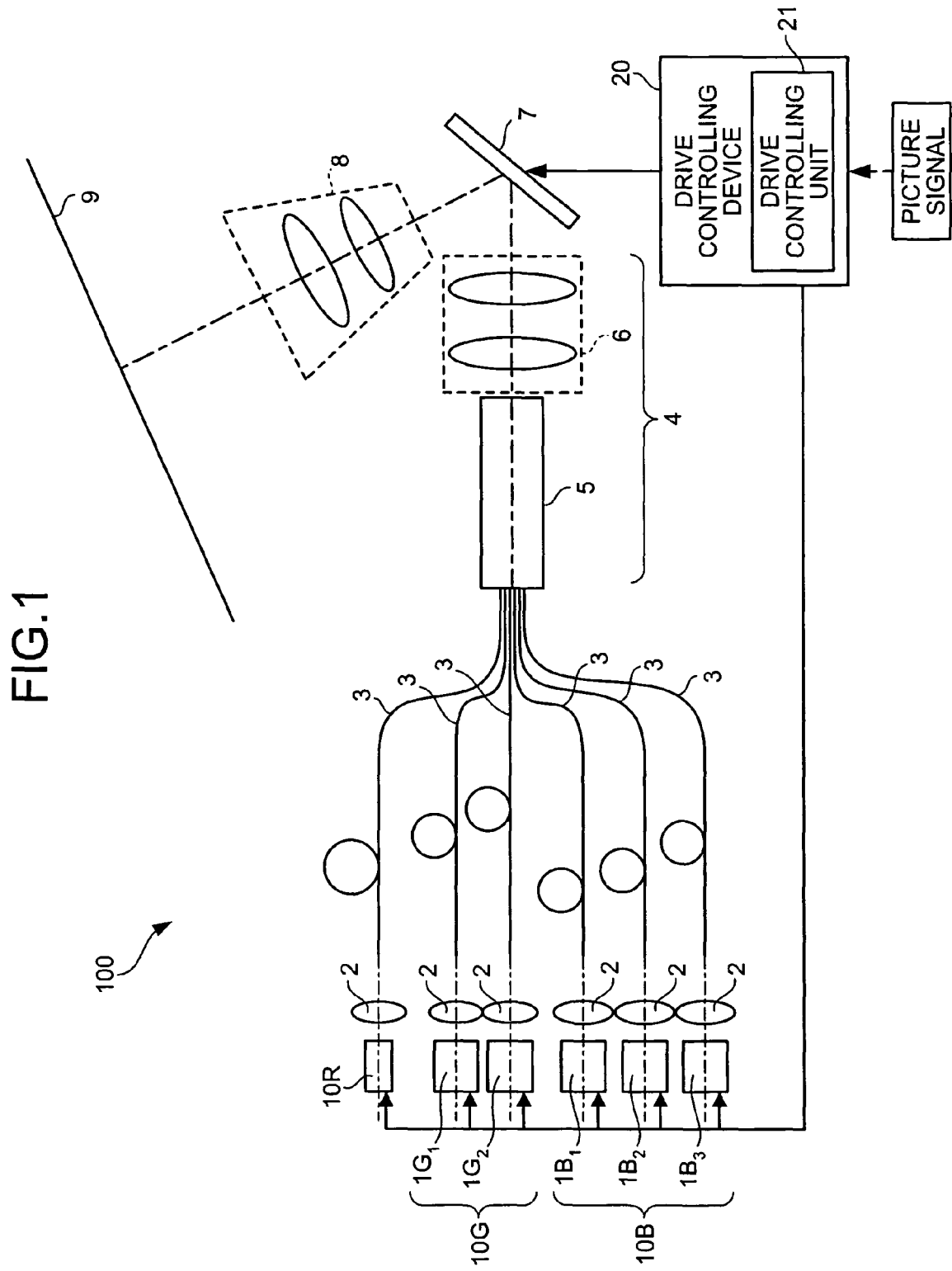
FIG. 1 is a diagram of an image displaying apparatus according to a first embodiment of the present invention.

FIG. 1 is a diagram of an image displaying apparatus according to a first embodiment of the present invention. An image displaying apparatus 100 is an image displaying apparatus (e.g., a full-color image displaying apparatus) that is used as a projection television and the like and in which a plurality of wavelength conversion laser beams for mutually the same color are used as light sources, and a gradation display of an image is realized by using a field sequential method. In the image displaying apparatus 100 according to the first embodiment, pulse driving is sequentially performed while the outputs are controlled so that the plurality of wavelength conversion lasers corresponding to mutually the same color have substantially the same peak power as one another. Also, the timing with which the pulse driving is performed is controlled so that, with respect to the outputs corresponding to mutually the same color, constant laser outputs are continuously obtained.

For example, the image displaying apparatus 100 brings a time at which a pulse of a laser beam emitted first falls, into synchronization with a time at which a pulse of a laser beam emitted second rises, so as to control the timing for driving the pulses in such a manner that the outputs for mutually the same color are continuously in a light-emitting state.

The image displaying apparatus 100 includes a red laser light source 10R, a green laser light source 10G, a blue laser light source 10B, a plurality of coupling lenses 2, a plurality of optical fibers 3, an illumination optical system 4, a spatial modulation element 7, a projection lens 8, a screen 9, and a drive controlling device 20. In the following explanation, the red laser light source 10R, the green laser light source 10G, and the blue laser light source 10B may be collectively referred to as laser light sources.

The red laser light source (i.e., a red laser emitting unit) 10R is a light source that emits a red semiconductor laser beam. The red laser light source 10R is connected to a corresponding one of the optical fibers 3 via a corresponding one of the coupling lenses 2.

The green laser light source (i.e., a laser light source having a plurality of outputs) 10G is a light source that emits wavelength conversion laser beams (in green) of a Laser Diode (LD) pumped solid-state laser. The green laser light source 10G includes two green laser emitting units (i.e., wavelength conversion laser light sources) $1G_1$ and $1G_2$ that emit laser beams having substantially the same peak wavelength and substantially the same peak output as each other. Each of the green laser emitting units $1G_1$ and $1G_2$ is configured so as to include a second harmonic wave generating device (not shown) that includes a wavelength converting element. Each of the green laser emitting units $1G_1$ and $1G_2$ is connected to a corresponding one of the optical fibers 3 via a corresponding one of the coupling lenses 2.

The blue laser light source (i.e., another laser light source having a plurality of outputs) 10B is a light source that emits wavelength conversion laser beams (in blue) of an LD pumped solid-state laser. The blue laser light source 10B includes three blue laser emitting units (i.e., wavelength conversion laser light sources) $1B_1$, $1B_2$, and $1B_3$ that emit laser beams having substantially the same peak wavelength and substantially the same peak output as one another. Each of the blue laser emitting units $1B_1$, $1B_2$, and $1B_3$ is configured so as to include a second harmonic wave generating device (not shown) that includes a wavelength converting element. Each of the blue laser emitting units $1B_1$, $1B_2$, and $1B_3$ is connected to a corresponding one of the optical fibers 3 via a corresponding one of the coupling lenses 2.

As the green laser beams emitted from the green laser light source 10G and the blue laser beams emitted from the blue laser light source 10B, it is possible to use second harmonic waves of LD pumped lasers such as an Nd:YAG laser, an Nd:YVO$_4$ laser, and an Nd:GdVO$_4$ laser.

As the wavelength converting elements included in the green laser emitting units 1G$_1$ and 1G$_2$ and the blue laser emitting units 1B$_1$, 1B$_2$, and 1B$_3$, it is possible to use a non-linear optical crystal such as KTP or a Periodically Poled Lithium Niobate (PPLN) crystal of LiNbO$_3$.

The image displaying apparatus 100 includes six coupling lenses 2. Each of the coupling lenses 2 is connected to a corresponding one of the red laser light source 10R, the green laser emitting units 1G$_1$ and 1G$_2$, and the blue laser emitting units 1B$_1$, 1B$_2$, and 1B$_3$, in a one-to-one correspondence. Each of the coupling lenses 2 changes the divergence angle of the luminous flux of the laser beam emitted from a corresponding one of the laser light sources and forwards the laser beam to a corresponding one of the optical fibers 3.

The image displaying apparatus 100 includes six optical fibers 3. Each of the optical fibers 3 is connected to a corresponding one of the coupling lenses 2, in a one-to-one correspondence. Each of the laser beams emitted from the laser light sources is joined with a corresponding one of the optical fibers 3 by using one of the coupling lenses 2 that corresponds to the laser light source. Each of the optical fibers 3 transfers the corresponding one of the laser beams emitted from the laser light sources that has been forwarded via the corresponding one of the coupling lenses 2 so that the laser beam is input to the illumination optical system 4.

The illumination optical system 4 includes an integrator rod 5 and a relay lens 6. The integrator rod 5 is an optical element that has a function of making uniform a spatial illumination distribution of light. The integrator rod 5 converts the laser beams that have been input from the plurality of optical fibers 3 into luminous fluxes that each have a rectangular shape and are uniform. The integrator rod 5 then forwards the laser beams that have been converted into the luminous fluxes having the rectangular shape and being uniform to the relay lens 6. The relay lens 6 forms an actual image from the laser beams forwarded by the integrator rod 5 on the spatial modulation element 7 so that the spatial modulation element 7 is uniformly illuminated.

The spatial modulation element 7 applies a spatial modulation to the laser beams that have been forwarded via the relay lens 6 and further forwards the laser beams to the projection lens 8. The projection lens 8 projects the laser beams from the spatial modulation element 7 on the screen 9. On the screen 9, an image formed by the laser beams that have been forwarded via the projection lens 8 is shown.

The drive controlling device (i.e., a display controlling device) 20 includes a drive controlling unit 21 that controls, according to a picture signal or the like that is input to the drive controlling device 20 from an external source, driving of the red laser light source 10R, the green laser emitting units 1G$_1$ and 1G$_2$, the blue laser emitting units 1B$_1$, 1B$_2$, and 1B$_3$, and the spatial modulation element 7. The drive controlling device 20 (i.e., the drive controlling unit 21) controls the outputs of the laser beams emitted from the red laser light source 10R, the green laser emitting units 1G$_1$ and 1G$_2$, and the blue laser emitting units 1B$_1$, 1B$_2$, and 1B$_3$. For example, the drive controlling device 20 controls the modes in which the laser beams are output by controlling the pumping LDs in a continuous driving mode or in a pulse driving mode. The drive controlling device 20 controls the position (i.e., a rotation angle) of the spatial modulation element 7 according to the controlled driving of the laser light sources.

Figure 2:
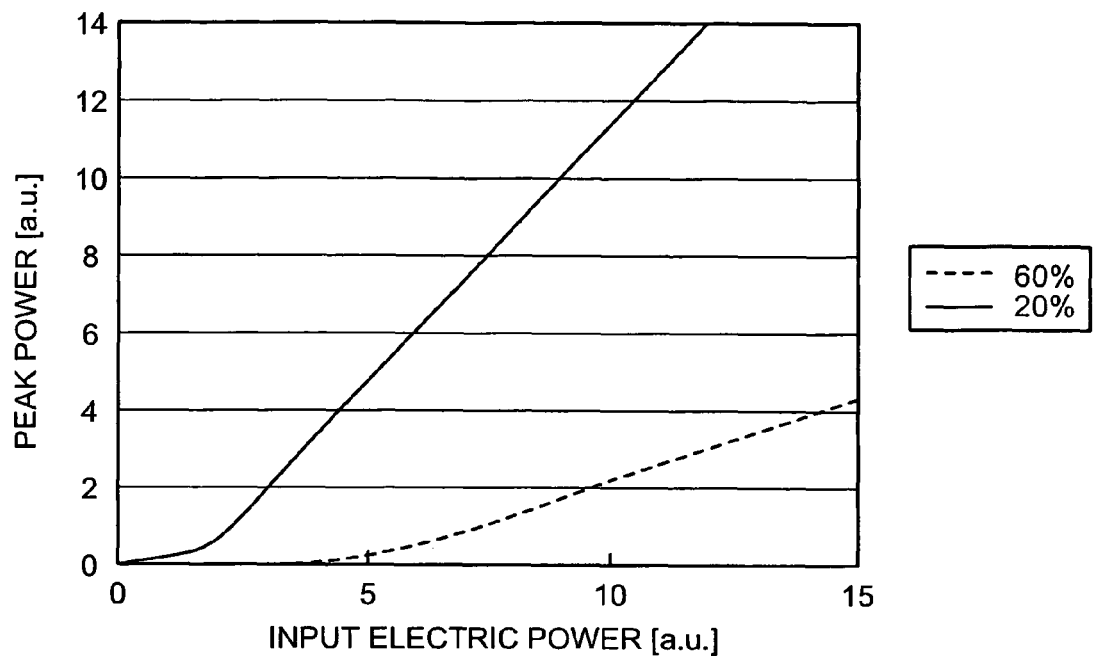
FIG. 2 is a chart for explaining relationships between duties in pulse driving and peak powers of a laser.

Next, a relationship between duties in the pulse driving of the LD pumped solid-state laser (a fundamental wave) and the wavelength conversion efficiency will be explained. FIG. 2 is a chart for explaining the relationships between the duties in the pulse driving and peak powers of a laser. In FIG. 2, an example of input/output characteristics is shown in correspondence with a case where the pulse driving of the LD pumped solid-state laser is performed with mutually different duties. The horizontal axis expresses the electric power (arbitrary unit [a.u.]) input to the laser light source. The vertical axis expresses the peak power (a.u.). The solid line indicates a peak power obtained in a case where the laser light source is driven with a 20% duty. The broken line indicates a peak power obtained in a case where the laser light source is driven with a 60% duty. As shown in FIG. 2, when the pulse driving is performed on the laser light source, the smaller the duty is, the more the heat-related environment is mitigated. Thus, when the duty is smaller, it is possible to obtain a higher peak power even if the input electric power is the same. When a wavelength converting method that employs a non-linear optical crystal is used, the peak power of the extracted second harmonic wave (i.e., the wavelength conversion laser) have relationships as shown in Expressions 1 and 2.

$$P_{2\omega} = \eta \times P_\omega \quad (1)$$

$$\eta \propto d_{eff}^2 \times 1^2 \times P_\omega / A \quad (2)$$

In Expressions 1 and 2, $P_{2\omega}$ denotes the power of the second harmonic wave (the wavelength conversion laser); $P_\omega$ denotes the peak power of the fundamental wave; $\eta$ denotes the wavelength conversion efficiency; $d_{eff}$ denotes an effective non-linear optical coefficient; and A denotes a cross-section area of the beam. As shown above, the power of the second harmonic wave (the wavelength conversion laser) is proportional to the square of the peak power of the fundamental wave being incident.

Figure 3:
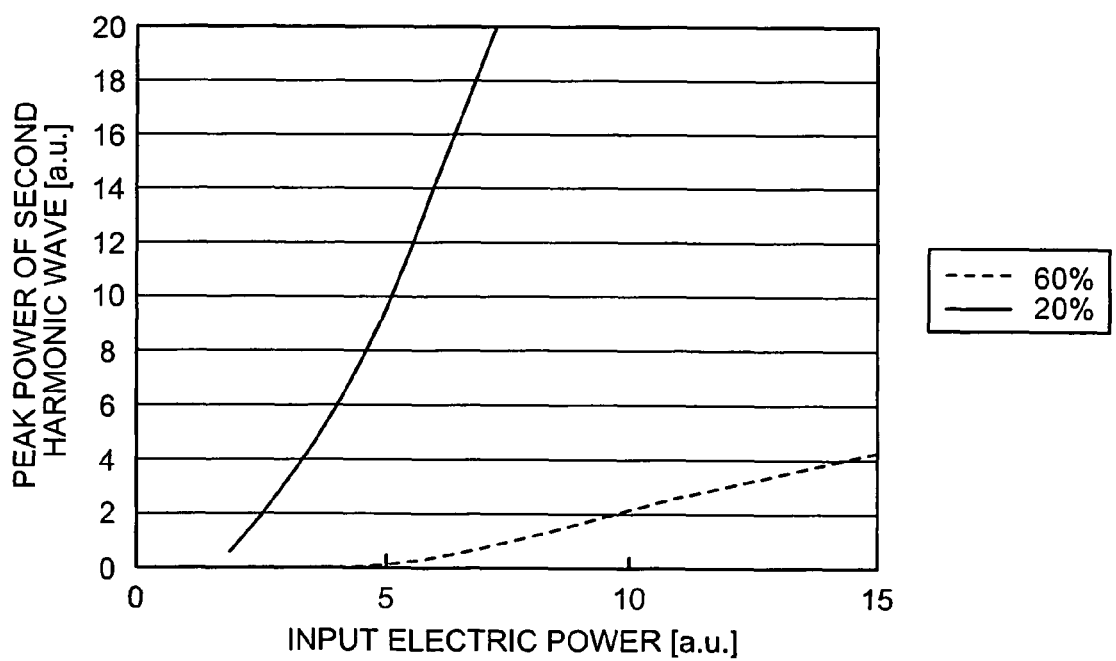
FIG. 3 is a chart for explaining relationships between duties in pulse driving and peak powers of a wavelength conversion laser.

FIG. 3 is a chart for explaining relationships between the duties in the pulse driving and the peak powers of the wavelength conversion laser. In FIG. 3, an example of the relationships between the input electric power and the peak power of the second harmonic wave is shown in correspondence with a case where the wavelength conversion laser is driven with two mutually different duties. The horizontal axis expresses the electric power input to the laser light source. The vertical axis expresses the peak power (a.u.) of the second harmonic wave. The solid line indicates a peak power obtained in a case where the laser light source is driven with a 20% duty. The broken line indicates a peak power obtained in a case where the laser light source is driven with a 60% duty. As shown in FIG. 3, when the pulse driving is performed on the laser light source, when the peak power is arranged to be higher by reducing the duty of the fundamental wave, it is possible to generate a second harmonic wave (i.e., a wavelength conversion laser) that has high efficiency.

Thus, according to the first embodiment, the peak power is arranged to be higher by reducing the duties of the wavelength conversion lasers. More specifically, while controlling the pulse driving of the green laser emitting units 1G$_1$ and 1G$_2$ and the blue laser emitting units 1B$_1$, 1B$_2$, and 1B$_3$ so that the duties of the wavelength conversion lasers become small, the drive controlling device 20 causes the laser emitting units to sequentially perform the pulse driving.

Also, according to the first embodiment, for example, a Digital Micromirror Device® (DMD) is used as the spatial modulation element 7. This element is a spatial modulation element in which as many small movable mirrors as the number of pixels are arranged in a row, the movable mirrors having sides that are each as small as tens of micrometers. The spatial modulation element 7 performs a spatial modulation process on the light being incident to the projection lens 8 by changing the angle of each of the movable mirrors according to a picture signal. A single-panel DMD® like this is used in the spatial modulation element 7 so that color images can be displayed by using the field sequential method. When the field sequential method is used, a time period corresponding to one TV field is divided into as many sections as the number of colors of the light sources (i.e., 3 in the present example) so that the colors are sequentially output. The field sequential method is based on a principle that the output colors are recognized by people as a full-color image, with the help of the integration function of the human eye by which colors are mixed together. Also, a gradation display is realized through the same principle as the one used in the field sequential method. More specifically, to achieve the gradation display, a section of the time period that is assigned to each of the colors (i.e., a time period used for the spatial modulation process) is divided (called an "intra-color division") into 10 bits (1024). The frequency with which each of the movable mirrors is moved is changed according to the light intensity during each of the time periods obtained as a result of the intra-color division.

Figure 4:
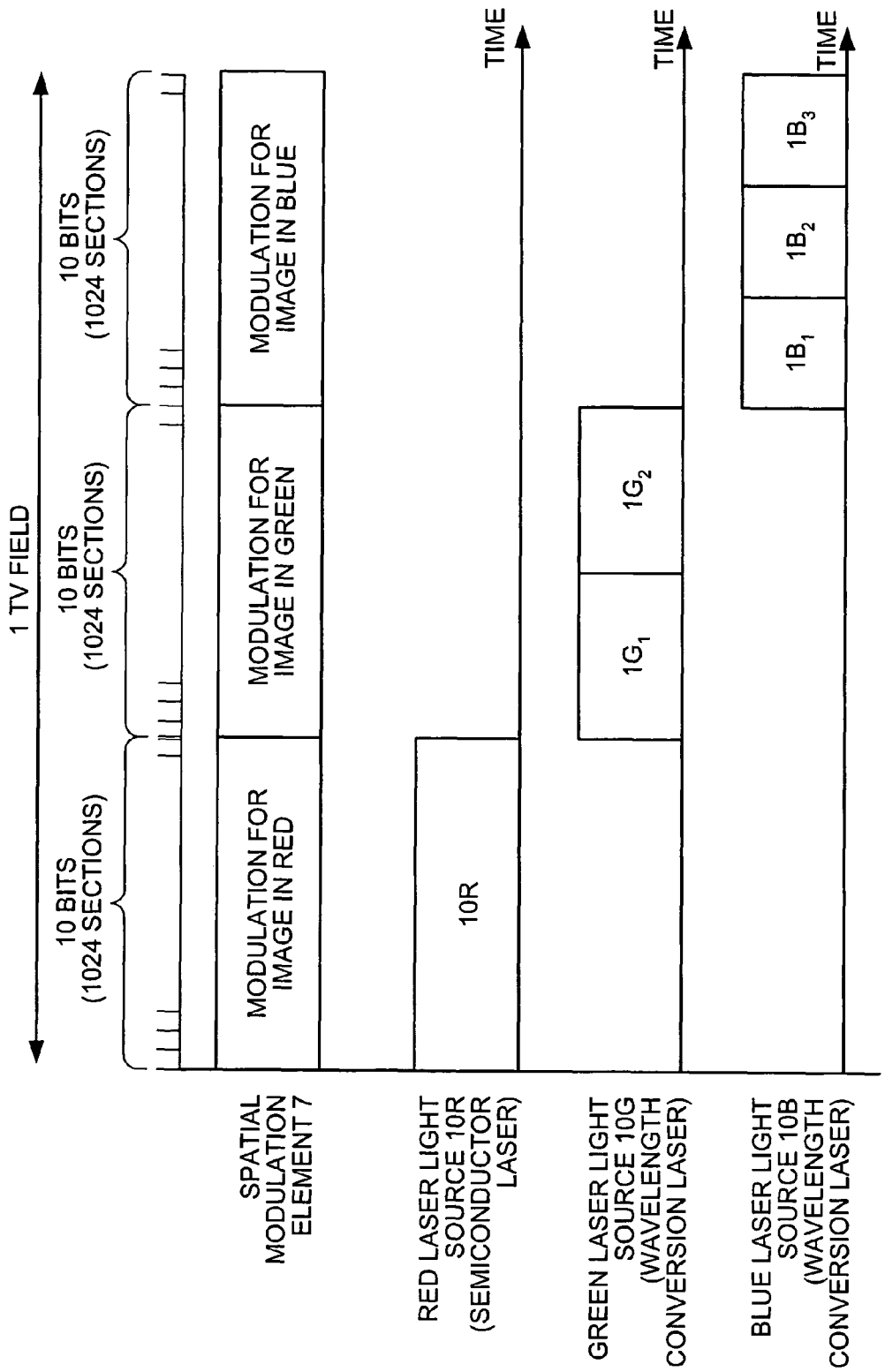
FIG. 4 is a timing chart for explaining operations of a spatial modulation element and laser light sources that are included in the image displaying apparatus according to the first embodiment.

Next, operations performed by the spatial modulation element 7 and the timing with which the laser beams are emitted by the laser light sources in the image displaying apparatus 100 will be explained. FIG. 4 is a timing chart for explaining the operations of the spatial modulation element and the laser light sources that are included in the image displaying apparatus according to the first embodiment. In FIG. 4, the operations of the spatial modulation element 7 and the timing with which laser beams are emitted by the laser light sources (the three primary color RGB lasers; the red laser light source 10R, the green laser light source 10G, and the blue laser light source 10B) are shown.

In the image displaying apparatus 100 according to the first embodiment, the green laser light source 10G includes the two green laser emitting units $1G_1$ and $1G_2$, whereas the blue laser light source 10B includes the three blue laser emitting units $1B_1$, $1B_2$, and $1B_3$. Thus, one TV field is divided into three sections in correspondence with the three primary colors (i.e., divided in correspondence with each of the colors). After that, a time period corresponding to green is further divided into two sections (i.e., divided in correspondence with each of the laser emitting units), and a time period corresponding to blue is further divided into three sections (i.e., divided in correspondence with each of the laser emitting units). Accordingly, the laser emitting units sequentially emit laser beams in such a manner that the section time period for each of the laser emitting units corresponds to one laser (i.e., one of the laser emitting units).

More specifically, the time period that corresponds to a laser beam emission in green is divided into the two sections so that the two section time periods are assigned to a laser beam emission period by the green laser emitting unit $1G_1$ and a laser beam emission period by the green laser emitting unit $1G_2$, respectively. Likewise, the time period that corresponds to a laser beam emission in blue is divided into the three sections so that the three section time periods are assigned to a laser beam emission period by the blue laser emitting unit $1B_1$, a laser beam emission period by the blue laser emitting unit $1B_2$, and a laser beam emission period by the blue laser emitting unit $1B_3$, respectively.

The drive controlling device 20 controls the driving electric current values for the laser emitting units so that, when the laser beams are emitted from the laser light sources, the peak powers have substantially the same value as one another during the laser beam emission period (corresponding to 10 bits) of the laser beams that correspond to mutually the same color.

More specifically, when the laser beams are emitted from the green laser light source 10G, the drive controlling device 20 controls the green laser emitting units $1G_1$ and $1G_2$ so that the peak power of the laser beam emitted from the green laser emitting unit $1G_1$ has substantially the same value as the peak power of the laser beam emitted from the green laser emitting unit $1G_2$.

Also, when the laser beams are emitted from the blue laser light source 10B, the drive controlling device 20 controls the blue laser emitting units $1B_1$, $1B_2$, and $1B_3$ so that the peak power of the laser beam emitted from the blue laser emitting unit $1B_1$, the peak power of the laser beam emitted from the blue laser emitting unit $1B_2$, and the peak power of the laser beam emitted from the blue laser emitting unit $1B_3$ have substantially the same value as one another. In addition, when the laser beams are emitted from the green laser emitting units $1G_1$ and $1G_2$, the drive controlling device 20 brings a time at which a laser pulse emitted from the green laser emitting unit $1G_1$ (i.e., a former laser emitting unit) ends, into synchronization with a time at which a laser pulse emitted from the green laser emitting unit $1G_2$ (i.e., a latter laser emitting unit) starts.

Also, when the laser beams corresponding to mutually the same color are emitted from the laser emitting units, the drive controlling device 20 controls the driving of the laser emitting units so that a time at which a laser pulse emitted from the former laser emitting unit ends is in synchronization with a time at which a laser pulse emitted from the latter laser emitting unit starts.

More specifically, when the laser beams are emitted from the blue laser emitting units $1B_1$, $1B_2$, and $1B_3$, the drive controlling device 20 brings a time at which a laser pulse emitted from the blue laser emitting unit $1B_1$ (i.e., a former laser emitting unit) ends, into synchronization with a time at which a laser pulse emitted from the blue laser emitting unit $1B_2$ (i.e., a latter laser emitting unit) starts. Also, the drive controlling device 20 brings a time at which a laser pulse emitted from the blue laser emitting unit $1B_2$ (i.e., a former laser emitting unit) ends, into synchronization with a time at which a laser pulse emitted from the blue laser emitting unit $1B_3$ (i.e., a latter laser emitting unit) starts.

LD pumped solid-state lasers are able to rise at a high speed within nanoseconds. Thus, the time period required for switching one pulse to another in the laser light sources corresponding to mutually the same color has hardly any influence on a unit of time period corresponding to 10 bits (i.e., approximately 5 microseconds). As a result, the spatial modulation element 7 is continuously illuminated with constant laser outputs during a section time period that corresponds to 10 bits and has been assigned to one color (in other words, during the time period in which a modulation signal for the color is supplied; in other words, while the spatial modulation element is driven based on the modulation signal for the corresponding color).

In a case where the transition periods for the laser beams (i.e., the time periods required for the pulses to rise or to fall) are not negligible, another arrangement is acceptable as an operation according to another mode where the emission of the laser pulse from the latter laser emitting unit starts a little before the time at which the laser pulse emitted from the former laser emitting unit ends.

Figure 5:
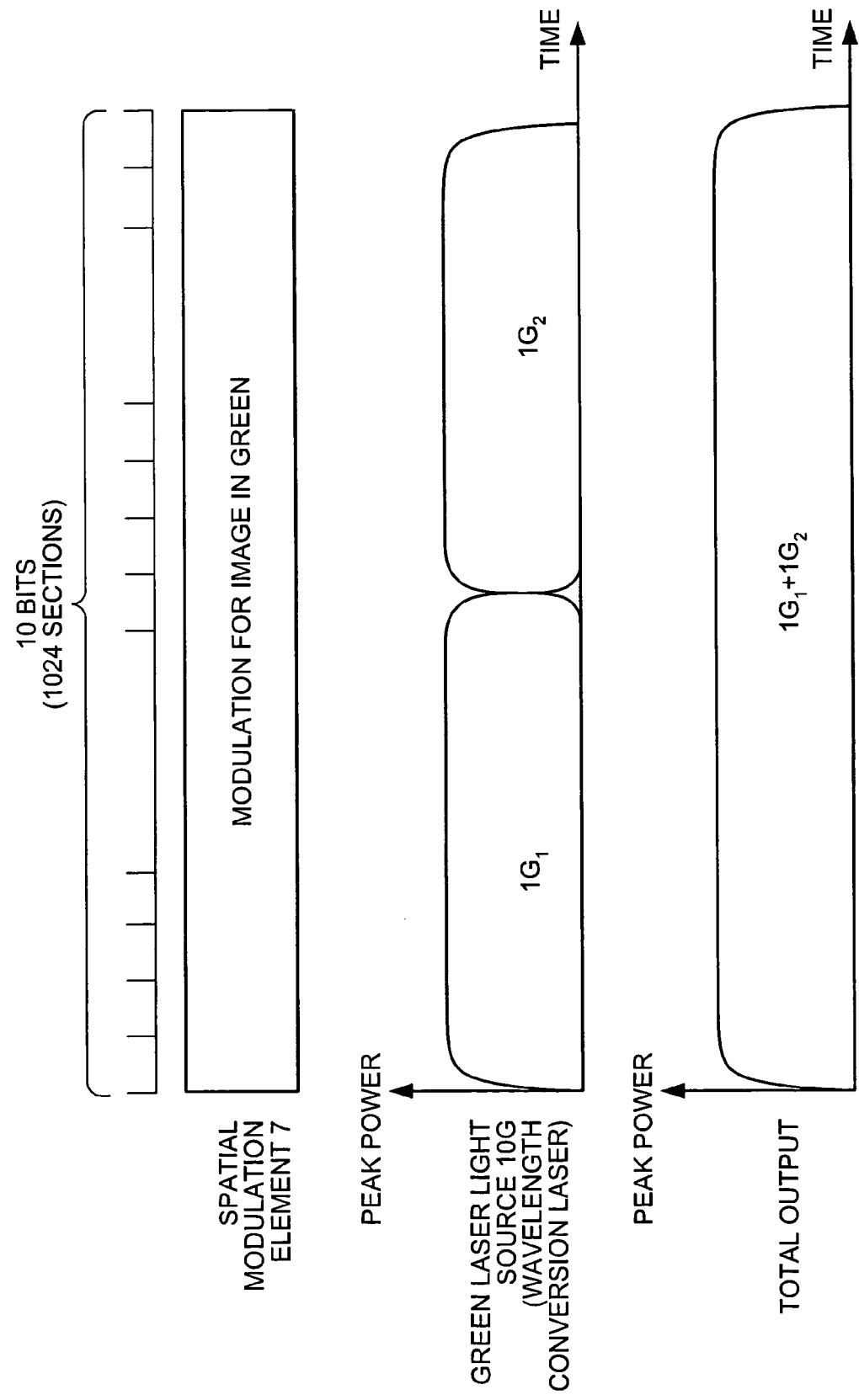
FIG. 5 is a timing chart for explaining another mode of operations of the spatial modulation element and the laser light sources that are included in the image displaying apparatus according to the first embodiment.

FIG. 5 is a timing chart for explaining another mode for the operations of the spatial modulation element and the laser light sources that are included in the image displaying apparatus according to the first embodiment. In FIG. 5, an example of operation timing of the spatial modulation element 7 and the green laser light source 10G is shown.

To control the laser emitting units so that the time at which the laser pulse emitted from the latter laser emitting unit starts partially overlaps the time at which the laser pulse emitted from the former laser emitting unit ends, a delay period for the laser pulse (the laser beam emission timing) shall be determined so that constant laser outputs (i.e., the peak powers) are continuously obtained from the laser emitting units that correspond to mutually the same color.

In other words, when the spatial modulation process is performed for any one of the colors (i.e., mutually the same color), the drive controlling device 20 controls the emission timing of the laser pulses so that constant laser outputs are continuously obtained for the one color, while a sum of the laser beam outputs during the time periods in which the pulses overlap with each other is taken into account.

When the gradation display method that employs the field sequential method is used, the light is modulated through the operation of the movable mirrors performed in units of section time period (i.e., 1024 units) included in the time period corresponding to 10 bits. Thus, it is desirable to keep the laser outputs constant during each unit of section time period and among mutually different units of section time period. The reason is because, if the amount of light in the laser beams changes during each unit of section time period, or if the amounts of light in the laser beams are different for different units of section time period, it is not possible to accurately reproduce the gradation. According to the first embodiment, for example, the laser outputs (i.e., the total output) are arranged so as to be constant in each unit of section time period and among mutually different units of section time period. With this arrangement, it is possible to accurately reproduce the gradation.

Figure 6:
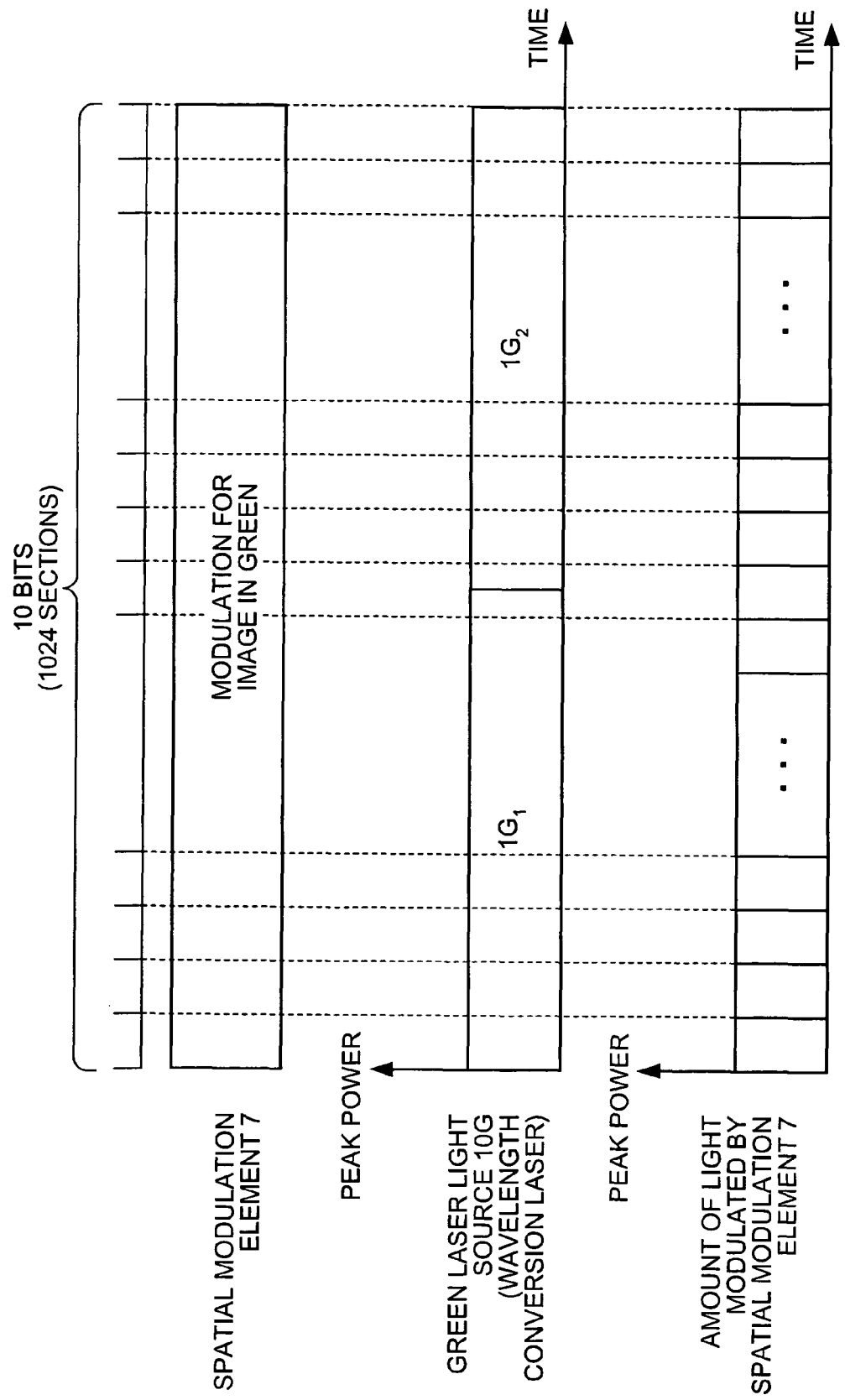
FIG. 6 is a chart for explaining amounts of light used in a modulation process performed by the spatial modulation element.

FIG. 6 is a chart for explaining the amounts of light used in the modulation process performed by the spatial modulation element. In FIG. 6, a relationship between the outputs of the green laser light source 10G and the amount of light modulated by the spatial modulation element 7 in each unit of section time period (i.e., the amount of light in each section time period) is shown. As shown in FIG. 6, in the image displaying apparatus 100, the amount of light modulated in each unit of section time period (1/1024) is substantially constant, as a result of the laser outputs that are substantially uniform.

Next, a difference between the pulse driving method according to the first embodiment and another pulse driving method (i.e., a conventional pulse driving method) will be explained so that it is possible to explain an advantageous effect obtained when the pulse driving is sequentially performed while the outputs are controlled in such a manner that a plurality of wavelength conversion lasers that correspond to mutually the same color have substantially the same peak power as one another.

First, a method by which the laser emitting units that correspond to mutually the same color emit laser beams at the same time as each other will be compared with the laser beam emission method according to the first embodiment (i.e., the method by which the laser beams are sequentially emitted from the laser emitting units). In the following section, a method by which the green laser light source 10G is driven so that the green laser emitting units $1G_1$ and $1G_2$ emit the laser beams at the same time as each other (i.e., a method that is shown in FIG. 7 and will be explained later) will be compared with another method by which the green laser light source 10G is driven so that the green laser emitting units $1G_1$ and $1G_2$ sequentially emit the laser beams (i.e., the method according to the first embodiment that is shown in FIG. 4).

Figure 7:
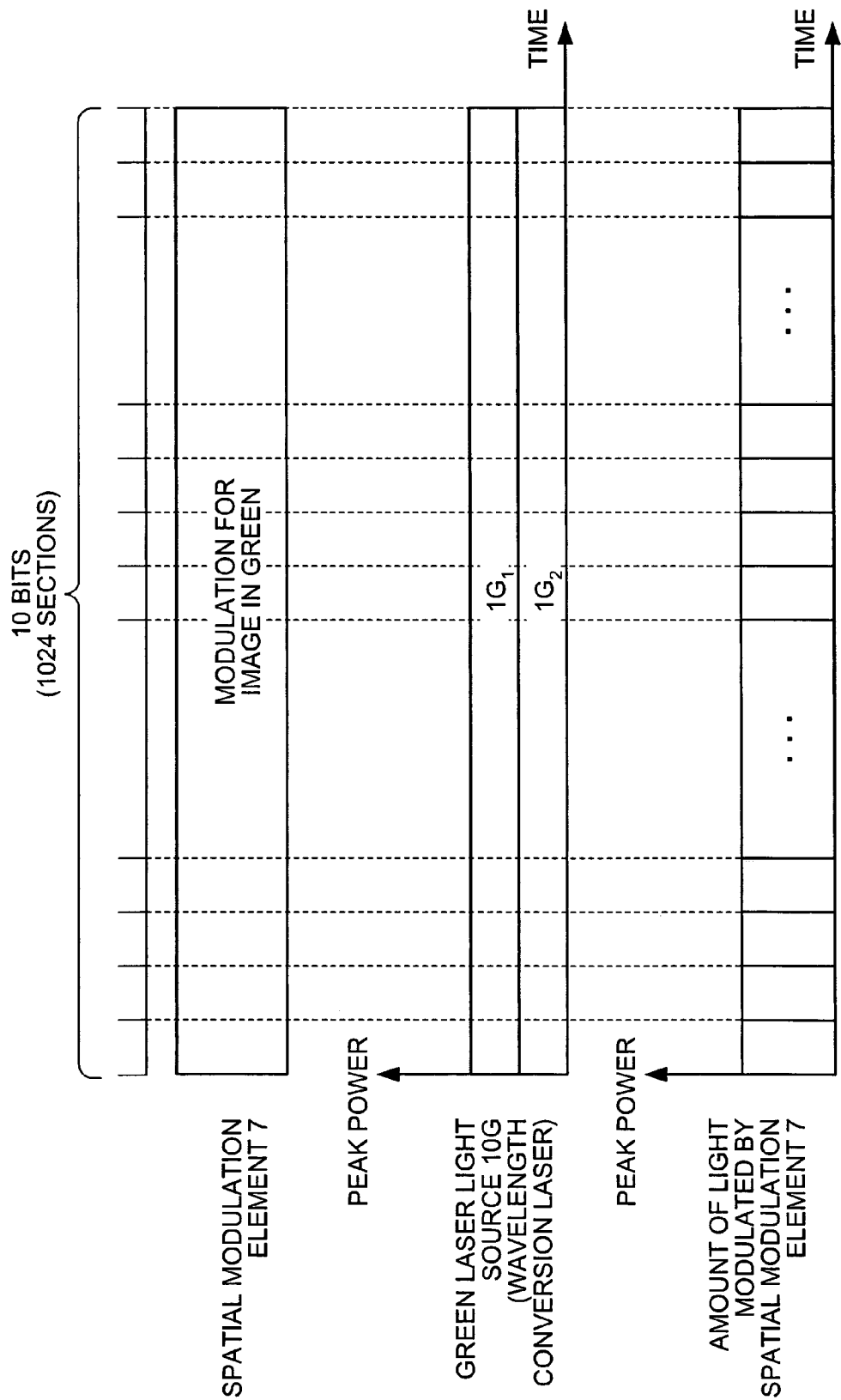
FIG. 7 is a timing chart for explaining an operation of the image displaying apparatus in a case where green laser emitting units emit laser beams at the same time as each other.

FIG. 7 is a timing chart for explaining an operation of the image displaying apparatus in a case where the green laser emitting units emit the laser beams at the same time as each other. In FIG. 7, a relationship between the operation timing of the spatial modulation element 7 and the green laser light source 10G and the amount of light modulated by the spatial modulation element 7 is shown in correspondence with the case where the green laser emitting units $1G_1$ and $1G_2$ emit the laser beams at the same time as each other.

When the driving method for the wavelength conversion lasers as shown in FIG. 7 is used (i.e., when the method by which the green laser light source 10G is driven so that the green laser emitting units $1G_1$ and $1G_2$ emit the laser beams at the same time as each other is used), the timing with which the spatial modulation element 7 is driven so as to have the laser beam in green emitted is arranged to be in synchronization with the timing with which the plurality of green laser emitting units $1G_1$ and $1G_2$ are driven. As a result, like the method shown in FIG. 4, the driving method for the wavelength conversion lasers shown in FIG. 7 makes it possible for the drive controlling device 20 to easily control the green laser emitting units $1G_1$ and $1G_2$ and the spatial modulation element 7. Also, even when the method shown in FIG. 7 is used, like when the method shown in FIG. 4 is used, the amount of light modulated in each unit of section time period is constant during the laser beam emission period of the same color. Thus, there is no problem in expressing the gradation.

When the method shown in FIG. 7 is used, to obtain the same average power during the laser beam emission period of the same color as obtained in the laser beam emission according to the method shown in FIG. 4, the peak powers of the wavelength conversion lasers are each half of the peak powers obtained when the wavelength conversion laser driving method according to the first embodiment shown in FIG. 4 is used. The reason is because, when the method shown in FIG. 7 is used, the two green laser emitting units $1G_1$ and $1G_2$ emit the laser beams at the same time as each other, whereas when the method shown in FIG. 4 is used, the laser beams are sequentially emitted from one laser emitting unit at a time.

However, if we compare the electric powers that need to be input to the laser light sources between the method shown in FIG. 7 and the method shown in FIG. 4, when the method shown in FIG. 7 is used, to obtain the same average power (i.e., to display an image having the same brightness) during the laser beam emission for the same color as obtained in the laser beam emission according to the method shown in FIG. 4, it is necessary to use approximately 1.5 times more electric power than when the wavelength conversion laser driving method according to the first embodiment shown in FIG. 4 is used. The reason is because, as understood from FIG. 3, when the laser beams are emitted from one laser emitting unit at a time, the larger the electric power input to the laser emitting unit is, the higher the wavelength conversion efficiency is.

As shown in FIG. 3, for example, when the laser light sources are driven with a 60% duty by using one laser emitting unit, to obtain the peak power "20" for the second harmonic wave, the input electric power is "7.5". However, when the laser light sources are driven with a 60% duty by using two laser emitting units, to obtain the peak powers "10" and "10" for the second harmonic wave in the laser emitting units, respectively, the input electric powers are "5" and "5". In other words, to obtain the peak power "20" for the second harmonic wave by using one laser emitting unit, the input electric power is "7.5", whereas to obtain the peak power "20"

for the second harmonic wave by using two laser emitting units, the input electric power should be "10".

As explained above, when the wavelength conversion laser driving method shown in FIG. 7 (i.e., the method by which the plurality of green laser emitting units emit the laser beams at the same time as each other) is used, the wavelength conversion efficiency is much lower than when the wavelength conversion laser driving method shown in FIG. 4 is used.

Next, a case in which the laser emitting units perform a normal pulse oscillation (i.e., a case in which a pulse oscillation is performed only at predetermined points in time during a section time period assigned to one color) will be compared with the laser beam emission method according to the first embodiment. In the following section, the output (i.e., the peak power) of the green laser light source 10G that is obtained when a normal pulse oscillation is performed by the green laser emitting units $1G_1$ and $1G_2$ (i.e., when a method that is shown in FIG. 8 and will be explained later is used) will be compared with the output of the green laser light source 10G that is obtained when the laser beam emission method according to the first embodiment (i.e., the method shown in FIG. 4) is used.

Figure 8:
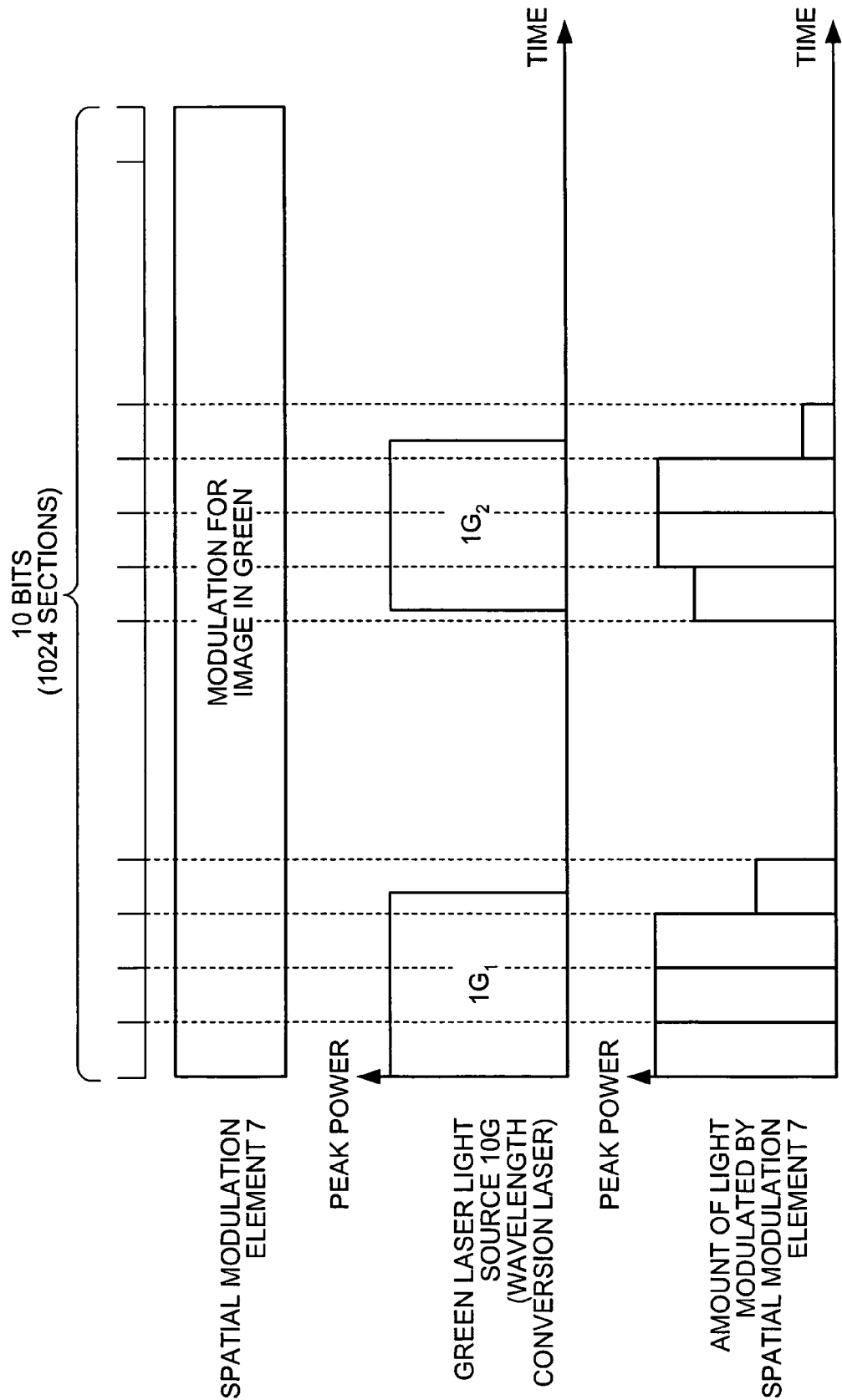
FIG. 8 is a timing chart for explaining an operation of the image displaying apparatus in a case where a pulse oscillation is performed only at predetermined points in time.

FIG. 8 is a timing chart for explaining an operation of the image displaying apparatus in a case where the pulse oscillation is performed only at predetermined points in time. In FIG. 8, a relationship between output amounts of the green laser emitting units $1G_1$ and $1G_2$ and the amount of light modulated by the spatial modulation element 7 in each unit of section time period is shown.

As shown in FIG. 8, when the pulse oscillation is performed only at the predetermined points in time, there may be a gap between a time at which a laser pulse emitted from a laser emitting unit starts or ends and an ending point of one unit of section time period during which the modulation process is performed by the spatial modulation element 7. Thus, the amount of light modulated in each unit of section time period is not constant. As a result, it is not possible to accurately display the gradation.

On the other hand, when the wavelength conversion laser driving method according to the first embodiment is used, the timing with which the pulse driving is performed is controlled so that constant laser outputs are continuously obtained as the output of the same color. With this arrangement, the amount of light modulated in each unit of section time period is constant. As a result, it is possible to accurately display the gradation.

Next, a case in which the pulse driving of the wavelength conversion lasers (i.e., the driving of the plurality of pulse lasers) is controlled so as to be in synchronization with the driving timing of the movable mirrors so that the amount of light modulated in each unit of section time period becomes constant will be compared with the laser beam emission method according to the first embodiment. In the following section, a case in which the pulse driving of the green laser emitting units $1G_1$ and $1G_2$ is controlled so as to be in synchronization with the driving timing of the movable mirrors (i.e., when a method that is shown in FIG. 9 and will be explained later is used) will be compared with the case in which the laser beam emission method according to the first embodiment (i.e., the method shown in FIG. 4) is used.

Figure 9:
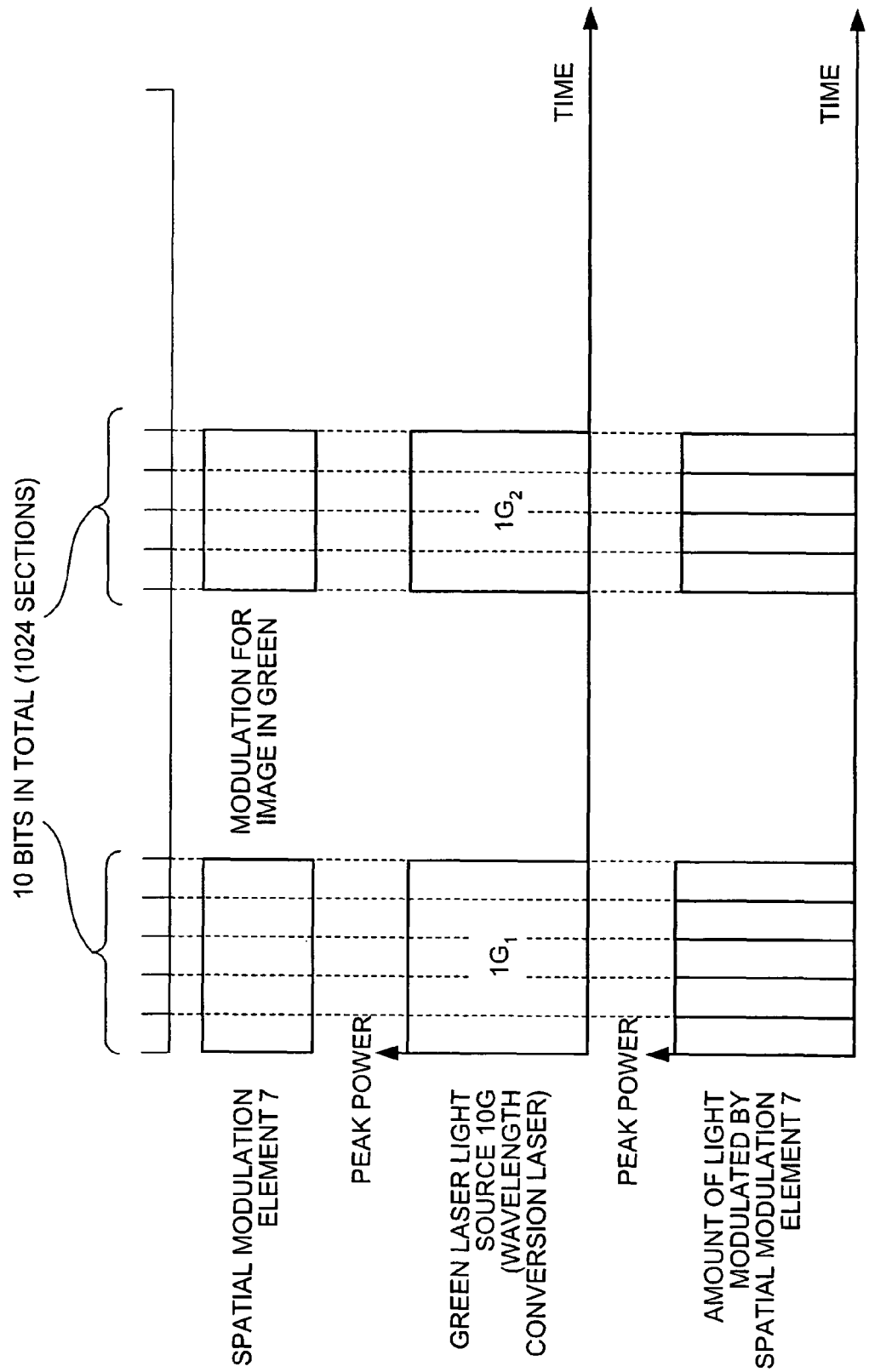
FIG. 9 is a timing chart for explaining an operation of the image displaying apparatus in a case where pulse driving of the laser emitting units are brought into synchronization with timing for driving movable mirrors.

FIG. 9 is a timing chart for explaining an operation of the image displaying apparatus in a case where the pulse driving of the laser emitting units is brought into synchronization with the driving timing of the movable mirrors. In FIG. 9, the units of section time period during which the modulation process is performed by the spatial modulation element 7 are shown in correspondence with the case where the pulse driving of the green laser emitting units $1G_1$ and $1G_2$ are brought into synchronization with the driving timing of the movable mirrors.

In this situation, the pulse oscillation is performed in the green laser emitting units $1G_1$ and $1G_2$ only at predetermined points in time, while the timing with which the pulse driving is performed is brought into synchronization with the driving timing of the movable mirrors. Thus, the time period during which the pulse driving is performed in the green laser emitting units $1G_1$ and $1G_2$ needs to be divided into sections of 10 bits. In other words, the total period of time during which the pulse driving is performed in the green laser emitting units $1G_1$ and $1G_2$ needs to be in correspondence with a time period for 10 bits that correspond to the driving period of the movable mirrors.

Thus, when the time period during which a green modulation signal is supplied (i.e., the time period assigned to the green laser emitting units $1G_1$ and $1G_2$) is divided into sections of 10 bits, the cycle of each unit of section time period is shorter than in the example according to the first embodiment (in which the method described above shown in FIG. 5 is used). In the current technological situation, it is difficult to perform the switching process with a cycle that is shorter than the section time period corresponding to 10 bits. Also, another problem arises where the configuration of the apparatus tends to be more complicated when the section time period needs to be arranged to fit the pulse width of the laser beam and when the control needs to be exercised so that the pulse driving of the laser beams are accurately in synchronization with the driving of the movable mirrors. In the image displaying apparatus 100 according to the first embodiment, however, the switching process for the movable mirrors is performed by using the section time period of 10 bits. Thus, it is possible to perform the switching process for the movable mirrors more easily and with a simpler configuration than in the example of the apparatus in which the switching process for the movable mirrors is performed with a cycle that is shorter than the section time period of 10 bits.

Further, in the future, even when it becomes possible to perform the switching process for the movable mirrors at a higher speed than in the current technological situation and thereby it becomes possible to perform the switching process on the movable mirrors with a shorter cycle, it is possible to obtain an image having higher quality by increasing the number of divided sections for which the switching process is performed, based on the method shown in FIG. 5 used by the image displaying apparatus 100 according to the first embodiment than in the case where the switching process is performed on the movable mirrors with a shorter cycle.

The configuration of the image displaying apparatus 100 and the values used for the image displaying apparatus 100 that are explained in the description of the first embodiment are not limited to the examples above. For example, when a time period is divided into sections in correspondence with the laser light sources for the different colors or for the same color, the time period does not have to be divided into sections that have the same length as one another. It is acceptable to divide the time period into sections having a mutually different length.

Further, the section time period corresponding to 10 bits for each of the colors according to the first embodiment is merely an example that has been determined based on a limit to the high-speed driving according to the switching method for mechanically driving the movable mirrors. Thus, another arrangement is acceptable in which the time period obtained by dividing one TV field into three sections corresponding to the three primary colors (i.e., the time period assigned to each of the colors) is further divided into sections by a value other than 10 bits. In other words, the period division number for each of the colors is not limited to 10 bits. If it becomes possible to perform the switching process to drive the movable mirrors at a higher speed, another arrangement is acceptable in which the time period assigned to any one of the colors is divided into sections by a number that is larger than 10 bits. Further, yet another arrangement is acceptable in which the time period assigned to any one of the colors is divided into sections by a number that is smaller than 10 bits. In this situation, it is possible to display the image more easily with a simpler configuration than in the case where the time period assigned to the one color is divided into the sections by 10 bits. As a result, it is possible to provide an image displaying apparatus at a lower cost.

In addition, according to the first embodiment, the time period in one TV field is divided into three sections so that the divided sections are assigned to the laser beam emissions corresponding to the three different colors, respectively. However, another arrangement is acceptable in which the time period in one TV field is divided into a number of sections other than three. For example, it is acceptable to divide the time period in one TV field into six sections or twelve sections so that the same color is displayed a plurality of times within one TV field, for the purpose of making it more difficult for the human eye to recognize color separation. In this situation, the period division number within one entire TV field should be a predetermined number of bits (e.g., 30 bits).

Furthermore, according to the first embodiment, the time period assigned to each of the colors (i.e., the time period during which the modulation signal is supplied; also called a "modulation period") is divided into as many sections as the number of laser emitting units that are included in the laser light source (i.e., the wavelength conversion laser) of the corresponding color. However, another arrangement is acceptable in which the time period assigned to each of the colors is divided into sections by a number other than the number of laser emitting units. For example, it is acceptable to divide the time period assigned to each of the colors by a number that is larger than the number of laser emitting units included in the laser light source of the corresponding color. In this situation, during the time period assigned to any one of the colors, laser beams are emitted from the same wavelength conversion laser (i.e., the laser emitting unit) a plurality of times.

In addition, although in the description above the example in which the spatial modulation element 7 is of the single-panel type was explained, the present invention is not limited to this example. It is acceptable to apply the present invention to a configuration in which the image displaying apparatuses 100 includes a plurality of spatial modulation elements 7.

Further, according to the first embodiment, the example in which the image displaying apparatus 100 (i.e., the color image projection apparatus) uses the laser light sources corresponding to the three primary colors, namely red (R), green (G), and blue (B), was explained. However, it is acceptable to apply the present invention to an image displaying apparatus that uses laser light sources corresponding to other colors than these. Furthermore, the number of colors to which the laser light sources correspond may be two or may be four or more.

In FIGS. 5 to 9, the example in which the green laser light source 10G is controlled is explained. However, it is possible to achieve the same advantageous effects as with the green laser light source 10G, by controlling the blue laser light source 10B in the same manner as the green laser light source 10G is controlled.

In the description of the first embodiment, the example in which the green laser light source 10G and the blue laser light source 10B each include the plurality of laser emitting units was explained. However, another arrangement is acceptable in which the red laser light source 10R includes a plurality of laser emitting units. Further alternatively, yet another arrangement is acceptable in which the green laser light source 10G includes three or more laser emitting units or in which the blue laser light source 10B includes two laser emitting units or four or more laser emitting units.

As explained above, the pulse driving of the plurality of wavelength conversion lasers corresponding to mutually the same color is sequentially performed so that the duty of each of the wavelength conversion lasers becomes smaller and the peak power becomes higher. Thus, it is possible to make the wavelength conversion efficiency higher and also to obtain an image displaying apparatus that is bright and has high efficiency.

In addition, the driving of the wavelength conversion lasers is controlled so that, during the time period in which the modulation signal is supplied for any one of the colors, constant laser beam outputs are obtained in a continuous light-emitting state, by sequentially performing the pulse driving on the plurality of wavelength conversion lasers corresponding to mutually the same color and bringing the time at which the pulse of the laser beam emitted first falls, into synchronization with the time at which the pulse of the laser beam emitted second rises. With this arrangement, the laser beam outputs used in the modulation process performed by the spatial modulation element 7 are constant. Thus, it is possible to accurately display the gradation. Further, it is possible to set the conditions under which the pulse driving is performed without being constrained by the mechanical switching period of the spatial modulation element 7.

As explained above, according to the first embodiment, it is possible to cause the wavelength conversion lasers to sequentially oscillate pulses while controlling the outputs of the laser emitting units so that the wavelength conversion lasers corresponding to mutually the same color have substantially the same peak power as one another. Also, the timing with which the pulse driving is performed is controlled so that constant laser outputs are continuously obtained. Thus, it is possible to utilize the laser beams efficiently and to easily display an image that has a high luminance and high quality with the simple configuration.

Next, a second embodiment of the present invention will be explained with reference to FIG. 10. According to the second embodiment, a time period assigned to any one of the colors is divided by a value obtained by adding a predetermined value (i.e., "units of section time period") to 10 bits and the added time period is assigned to a transition time period of the laser pulses.

The image displaying apparatus 100 according to the second embodiment has the same configuration as the image displaying apparatus 100 according to the first embodiment shown in FIG. 1. Thus, the explanation thereof will be omitted. The image displaying apparatus 100 according to the second embodiment controls the spatial modulation element 7 and the laser light sources corresponding to the colors with driving timing that is different from the one used by the image displaying apparatus 100 according to the first embodiment.

Figure 10:
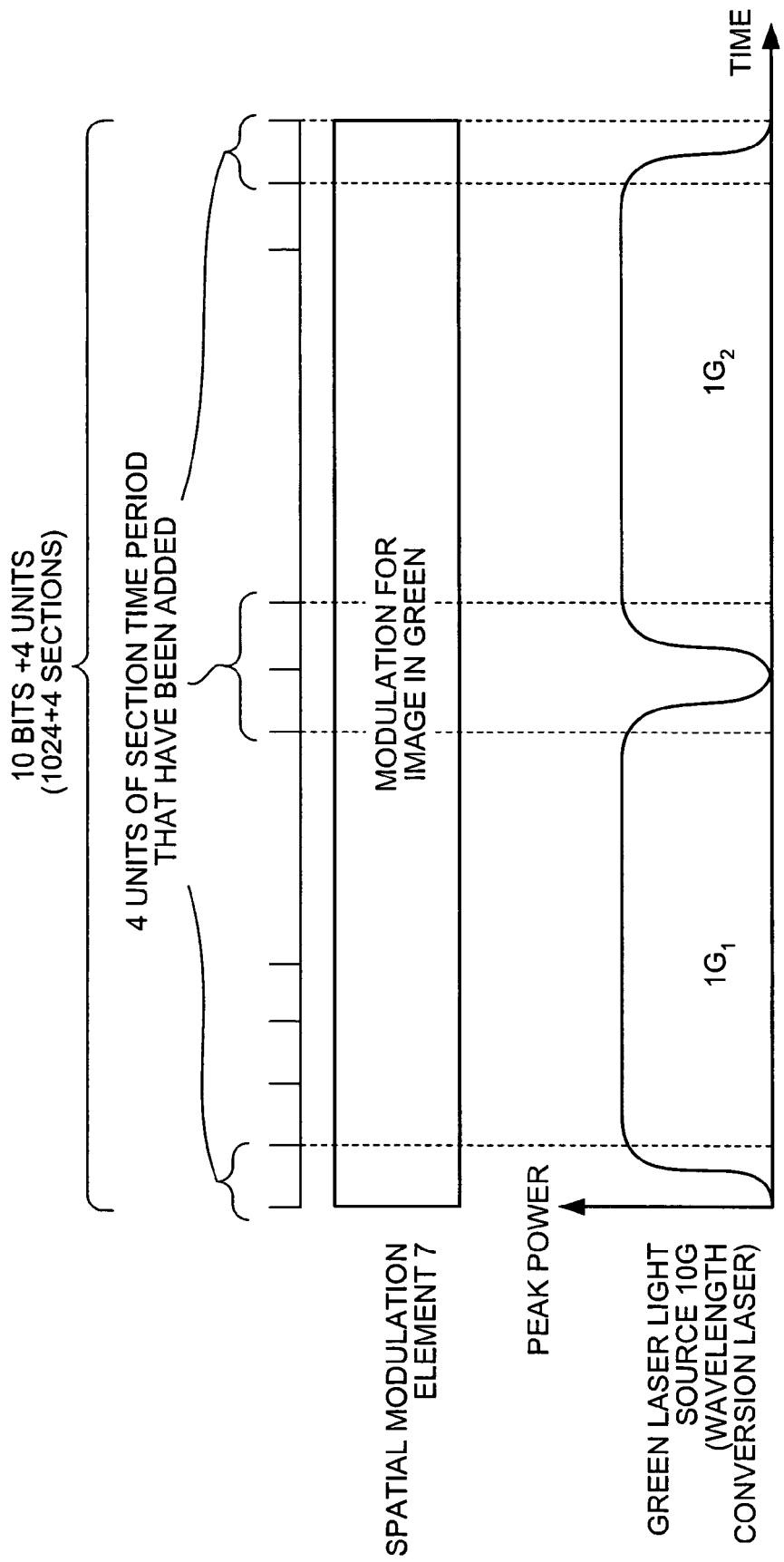
FIG. 10 is a timing chart for explaining operations of a spatial modulation element and laser light sources that are included in an image displaying apparatus according to a second embodiment of the present invention.

FIG. 10 is a timing chart for explaining operations of the spatial modulation element and the laser light sources that are included in the image displaying apparatus according to the second embodiment. In FIG. 10, the laser beam emission timing of the wavelength conversion lasers (i.e., the green laser emitting units $1G_1$ and $1G_2$) included in the image displaying apparatus 100 is shown. The time period (i.e., the modulation period) assigned to the green laser light source 10G that includes the plurality of laser emitting units corresponding to mutually the same color (i.e., green) is divided by a value obtained by adding a predetermined number of units of section time period to 10 bits (1024 units of section time period). The units of section time period added to the 10 bits are assigned to the transition time period of the laser pulses for the green laser beams.

For example, four units of section time period is added to the 10 bits so that the time period assigned to the green laser light source 10G is divided by 1024+4. One unit of section time period is assigned before and after the pulse oscillation of the green laser emitting unit $1G_1$. Also, one unit of section time period is assigned before and after the pulse oscillation of the green laser emitting unit $1G_2$. During the four units of section time period that have been added, no spatial modulation process is performed by the spatial modulation element 7. When the driving of the wavelength conversion lasers is controlled in this manner, there is an ineffective time period the length of which corresponds to the added units of section time period. Thus, the pulse driving is brought into synchronization with the operation of the spatial modulation element 7.

As explained above, in the image displaying apparatus 100 according to the second embodiment, there is no need to have high-speed laser pulse responses unlike in the image displaying apparatus 100 according to the first embodiment. In addition, in the image displaying apparatus 100 according to the second embodiment, within the range of the added units of section time period, it is possible to allow the pulse width and the transition period of the laser beams to have a likelihood. Thus, it is possible to easily display images by using the laser-driving electric power source having the simple configuration. In addition, it is possible to easily control the laser light sources and the spatial modulation element 7 by using the drive controlling device 20. As a result, it is possible to easily develop the laser-driving electric power source.

Further, like in the image displaying apparatus 100 according to the first embodiment, in the image displaying apparatus 100 according to the second embodiment also, the peak power is arranged to be higher by making the duties of the plurality of wavelength conversion lasers corresponding to mutually the same color smaller. Thus, it is possible to make the wavelength conversion efficiency higher.

Next, a third embodiment of the present invention will be explained with reference to FIGS. 11 and 12. According to the third embodiment, the outputs of the laser light sources are controlled, based on the light intensity (i.e., an illuminance level) for each of the colors in the entire screen, so as to have output values that are in accordance with gradation levels that are used when a color image is displayed in gradation.

Figure 11:
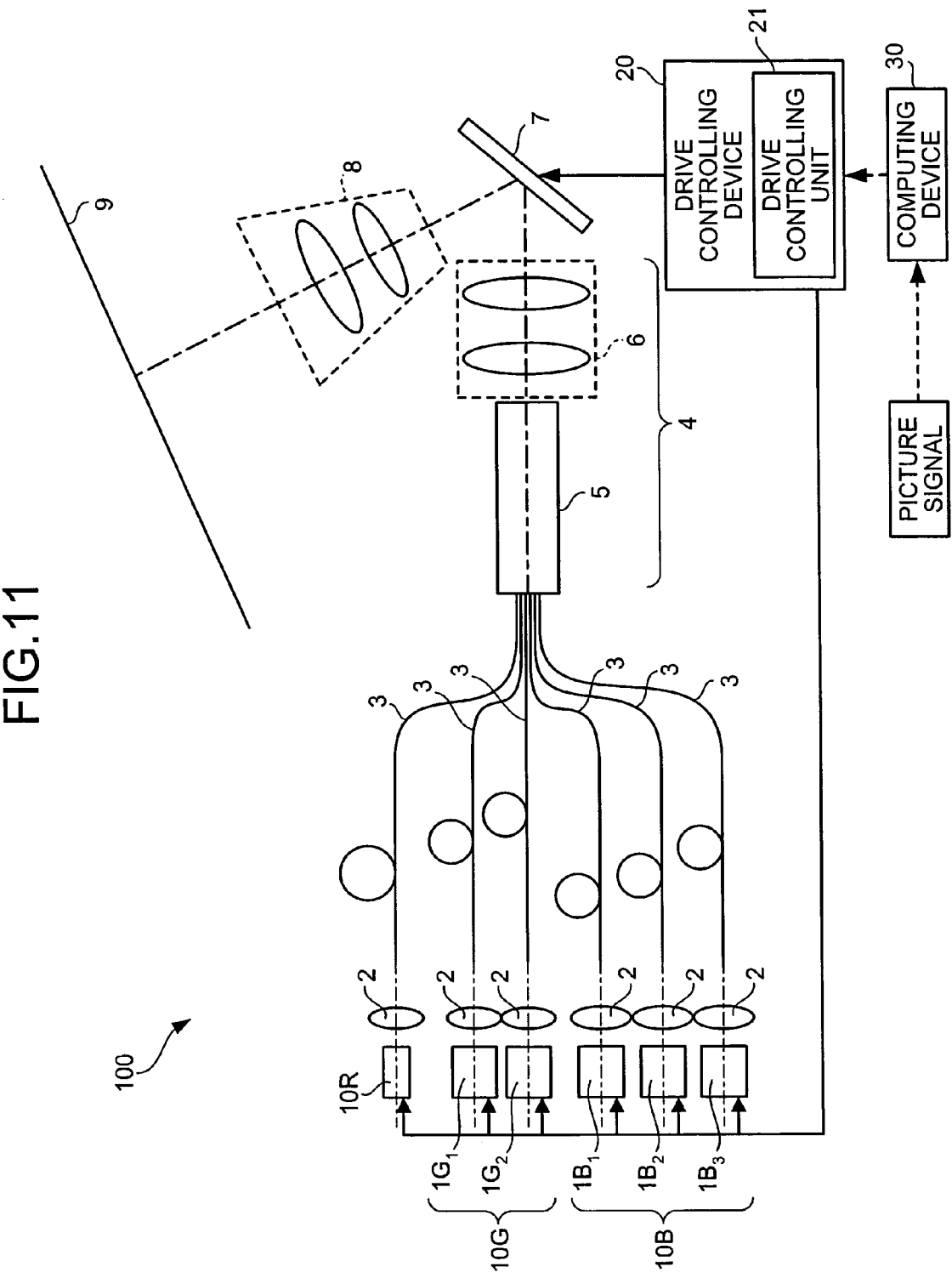
FIG. 11 is a diagram of an image displaying apparatus according to a third embodiment of the present invention.

FIG. 11 is a diagram of the image displaying apparatus according to the third embodiment. In FIG. 11, some of the constituent elements that have the same functions as those in the image displaying apparatus 100 according to the first embodiment shown in FIG. 1 are referred to by using the same reference characters, and the explanation thereof will be omitted.

The image displaying apparatus 100 according to the third embodiment includes a computing device 30 in addition to the red laser light source 10R, the green laser light source 10G, the blue laser light source 10B, the plurality of coupling lenses 2, the plurality of optical fibers 3, the illumination optical system 4, the spatial modulation element 7, the projection lens 8, the screen 9, and the drive controlling device 20.

The computing device 30 is connected to the drive controlling device 20. To improve the expression of gradation by controlling the light outputs of the laser light sources, the computing device 30 detects the light intensity for each of the colors in the entire screen and performs, based on the detection result, a predetermined computing process on a laser output control signal corresponding to a picture signal that is input from an external source. The computing device 30 inputs the laser output control signal on which the computing process has been performed to the drive controlling device 20. The drive controlling device 20 controls the outputs of the laser light sources based on the laser output control signal from the computing device 30. The gradation expression that is realized by the spatial modulation element 7 included in the image displaying apparatus 100 uses 10 bits (1024 levels of gradation), whereas the laser output modulation realized by the drive controlling device 20 uses 2 bits (4 levels of gradation).

The picture signal that has been input to the computing device 30 from an external signal source or the like is stored into a memory within the computing device 30 in correspondence with each TV field. The computing device 30 detects, based on the picture signal, information (i.e., information related to the light intensity in the entire screen) corresponding to each of the colors (e.g., the three colors such as red, blue, and green).

The computing device 30 searches for information of all the pixels in the screen for each of the colors and separates the picture signal into gradation information of 12 bits. Also, the computing device 30 performs a computing process to divide the information of all the pixels into 10 bits for the spatial modulation element 7 and a modulation signal of 2 bits for the laser output. Further, the computing device 30 converts any graduation signal that is higher than 3072 from a 12-bit signal to a 10-bit signal. The reason for this can be explained as follows: according to the third embodiment, the gradation is expressed by using 12 bits obtained by the modulation of the laser output with 2 bits and the modulation of the spatial modulation element 7 with 10 bits; however, when the laser output is in full bits, the gradation is controlled only by the modulation process performed by the spatial modulation element 7 so that the gradation is expressed by using 10 bits. Because the human eye is more sensitive to a dark gradation than to a bright gradation, the image displaying apparatus 100 according to the third embodiment is able to improve the expression of the gradation and to have people recognize an image having higher quality.

Figure 12:
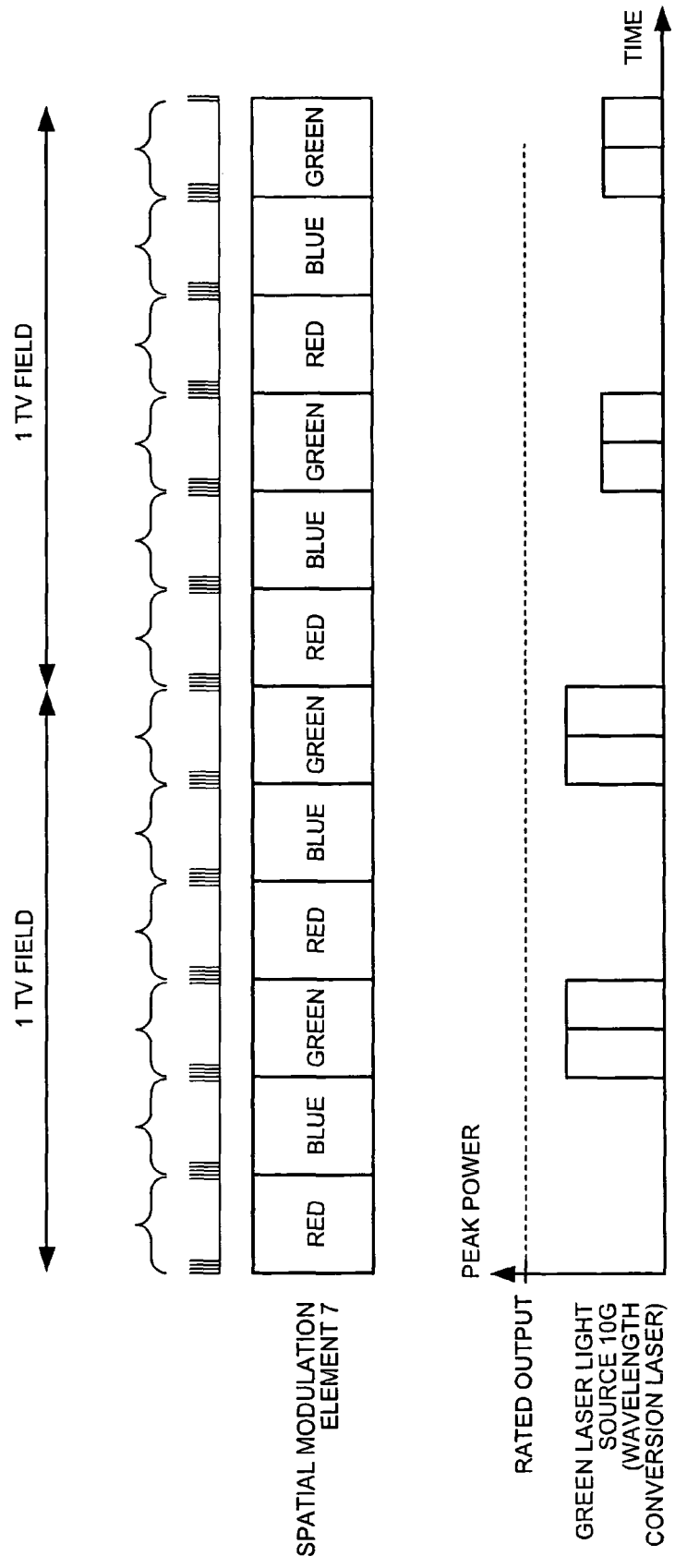
FIG. 12 is a timing chart for explaining an operation of the image displaying apparatus according to the third embodiment.

FIG. 12 is a timing chart for explaining an operation of the image displaying apparatus according to the third embodiment. In FIG. 12, the driving timing of the spatial modulation element 7 and the laser light sources corresponding to the colors as well as the laser beam emission timing of the green laser light source 10G are shown.

The laser output control signals corresponding to the colors are forwarded from the computing device 30 to the drive controlling device 20, by using each TV field as a unit. The drive controlling device 20 controls the laser outputs in four gradation levels, based on the laser output control signals corresponding to the colors that have been output by the computing device 30.

In addition, according to the third embodiment, the number of sections (i.e., hereinafter "a color division number") into which one TV field is divided in correspondence with the three primary colors is, for example, six. In each TV field, each of the colors is displayed twice. When one TV field is divided into six sections, the TV field may be equally divided into six sections, but does not have to be equally divided. The color division number in correspondence with the three primary colors for each TV field does not have to be six; it is acceptable to use any number as the color division number. By increasing the number of sections into which each TV field is divided in this manner, it is possible to prevent a temporal color-separation phenomenon called "color breaking" from occurring. Thus, it is possible to obtain an image having higher quality than when the number of sections into which the TV field is divided is smaller.

The configuration of the image displaying apparatus 100 and the values used for the image displaying apparatus 100 that are explained in the description of the third embodiment are not limited to the examples above. For example, by controlling the laser outputs more finely than in 2 bits, it is possible to improve the expression of the gradation in a wider range. In addition, when conventional lamp light sources are used, the number of sections into which one TV field is divided in correspondence with any one of the colors is limited due to the rotation speed of the color wheel and a blanking time. However, when the laser light sources are used, it is possible to switch the laser light sources on and off at a high speed. Thus, it is possible to make the number of divided sections higher. As a result, it is possible to reduce color separation and to obtain an image having higher quality.

Further, when the peak power of each laser beam is at a low level, the degree with which the level of the peak power contributes to the wavelength conversion efficiency is high. Thus, even when the laser outputs are modulated as explained in the description of the third embodiment, making the peak powers higher by making the duties of the wavelength conversion lasers smaller is effective for obtaining an image displaying apparatus that is brighter and has higher efficiency.

As explained above, according to the third embodiment, by controlling the outputs of the laser light sources, it is possible to express the gradation more finely than the limit of the high-speed switching performance of the spatial modulation element 7. In addition, the luminance of the illumination light is changed according to the luminance of the entire screen. Thus, it is possible to obtain an image having a higher contrast. Furthermore, because a time period during which the laser outputs are controlled so as to be below a rated level is longer, it is possible to reduce the electric power consumption and to make the lifetime of the laser light sources longer.

According to one embodiment of the present invention, it is possible to make the peak powers higher by making the duties of the wavelength conversion lasers smaller. It is also possible to accurately display the gradation by using a constant amount of light. Thus, an advantageous effect is achieved where it is possible to easily display an image having a high luminance and high quality by using the simple configuration and using the laser beams efficiently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image displaying apparatus operable to display a color image comprising:

laser light sources that correspond to a plurality of colors, at least one of the laser light sources corresponding to one of the colors including a plurality of wavelength conversion laser light sources corresponding to a mutually same color, and having a plurality of outputs;

a spatial modulation element that performs a spatial modulation process on laser beams output from the laser light sources by using a field sequential method to display a color image; and a drive controlling unit that controls driving of the laser light sources and also controls driving of the spatial modulation element according to the controlled driving of the laser light sources, wherein when the spatial modulation element performs the spatial modulation process on the laser beams output from the at least one of the laser light sources having the plurality of outputs, during a time period assigned to the one of the colors corresponding to the laser light source having the plurality of outputs, the drive controlling unit controls timing with which a pulse driving is performed by each of the wavelength conversion laser light sources so that the wavelength conversion laser light sources sequentially output pulses in such a manner that the laser beams output from the wavelength conversion laser light sources have a substantially same peak power as one another and so that substantially constant laser outputs are continuously obtained from the wavelength conversion laser light sources and causes the wavelength conversion laser light sources to output the laser beams in such a manner that there is a predetermined delay period between an ending point of the pulse of the laser beam output from one of the wavelength conversion laser light sources that is driven first and a starting point of the pulse of the laser beam output from another one of the wavelength conversion laser light sources that is driven second and also that a trailing section of the first-driven laser beam partially overlaps a rising section of the second-driven laser beam, while the first-driven wavelength conversion laser light source and the second-driven wavelength conversion laser light source are light sources of the same color.

2. The image displaying apparatus according to claim 1, wherein when the spatial modulation element performs the spatial modulation process on the laser beams output from the at least one of the laser light sources having the plurality of outputs, during the time period assigned to the one of the colors corresponding to the laser light source having the plurality of outputs, the drive controlling unit controls timing with which a pulse driving is performed by each of the wavelength conversion laser light sources so that a transition period during which the laser beams output from the wavelength conversion laser light sources make a transition between one another is a time period during which the spatial modulation element performs no spatial modulation process and so that substantially constant laser outputs are continuously obtained from the wavelength conversion laser light sources during a time period except for the transition period.

3. The image displaying apparatus according to claim 1, wherein the drive controlling unit controls the outputs from the wavelength conversion laser light sources so as to have output values according to a gradation level that is used when the color image is displayed in gradation.

4. A display controlling device that is operable to control driving of laser light sources and a spatial modulation element that are included in an image displaying apparatus including the laser light sources corresponding to a plurality of colors, while at least one of the laser light sources corresponding to one of the colors includes a plurality of wavelength conversion laser light sources corresponding to a mutually same color and has a plurality of outputs, the image displaying apparatus being operable to display a color image by causing the spatial modulation element to perform a spatial modulation process on laser beams output from the laser light sources by using a field sequential method, the display controlling device comprising:

a drive controlling unit that, when the spatial modulation element performs the spatial modulation process on the laser beams output from the at least one of the laser light sources having the plurality of outputs, during a time period assigned to the one of the colors corresponding to the laser light source having the plurality of outputs, controls timing with which a pulse driving is performed by each of the wavelength conversion laser light sources so that the wavelength conversion laser light sources sequentially output pulses in such a manner that the laser beams output from the wavelength conversion laser light sources have a substantially same peak power as one another and so that substantially constant laser outputs are continuously obtained from the wavelength conversion laser light sources and causes the wavelength conversion laser light sources to output the laser beams in such a manner that there is a predetermined delay period between an ending point of the pulse of the laser beam output from one of the wavelength conversion laser light sources that is driven first and a starting point of the pulse of the laser beam output from another one of the wavelength conversion laser light sources that is driven second and also that a trailing section of the first-driven laser beam partially overlaps a rising section of the second-driven laser beam, while the first-driven wavelength conversion laser light source and the second-driven wavelength conversion laser light source are light sources of the same color.

* * * * *